United States Patent [19]

Roettger et al.

[11] Patent Number: 4,885,981
[45] Date of Patent: Dec. 12, 1989

[54] SPRING RETURN CYLINDER ACTUATOR

[75] Inventors: William J. Roettger, Rice; Douglas J. Tanner, Sartell, both of Minn.

[73] Assignee: General Signal Corporation, N.Y.

[21] Appl. No.: 179,541

[22] Filed: Apr. 8, 1988

[51] Int. Cl.$^4$ .................. F01B 29/00; F01B 31/00
[52] U.S. Cl. .................... 92/59; 92/128; 92/130 R; 92/161; 137/270
[58] Field of Search .............. 92/59, 128, 130 R, 133, 92/135, 146, 161; 137/270; 251/63.6

[56] References Cited

U.S. PATENT DOCUMENTS

| | | | |
|---|---|---|---|
| 2,527,814 | 10/1950 | Hanssen | 92/59 |
| 2,643,667 | 6/1953 | Dahl | 92/95 X |
| 3,122,065 | 2/1964 | Laun | 92/130 R X |
| 4,523,515 | 6/1985 | Smith | 92/59 |
| 4,582,082 | 4/1986 | Tosseghini | 92/59 X |
| 4,712,576 | 12/1987 | Ariizumi et al. | 92/59 X |

Primary Examiner—Robert E. Garrett
Assistant Examiner—Mark A. Williamson
Attorney, Agent, or Firm—Barnes & Thornburg

[57] ABSTRACT

A reversible spring return cylinder actuator having a pair of piston rods extending from a common spring load piston to the exterior of the housing. In a non-pressure position of the piston, one of the piston rods extends further from the housing than the other. Either piston rod and either end of the housing can be mounted to a device to be actuated so that the same actuator can be used to define a non-pressure extend or retracted actuator without disassembly of the actuator.

9 Claims, 2 Drawing Sheets

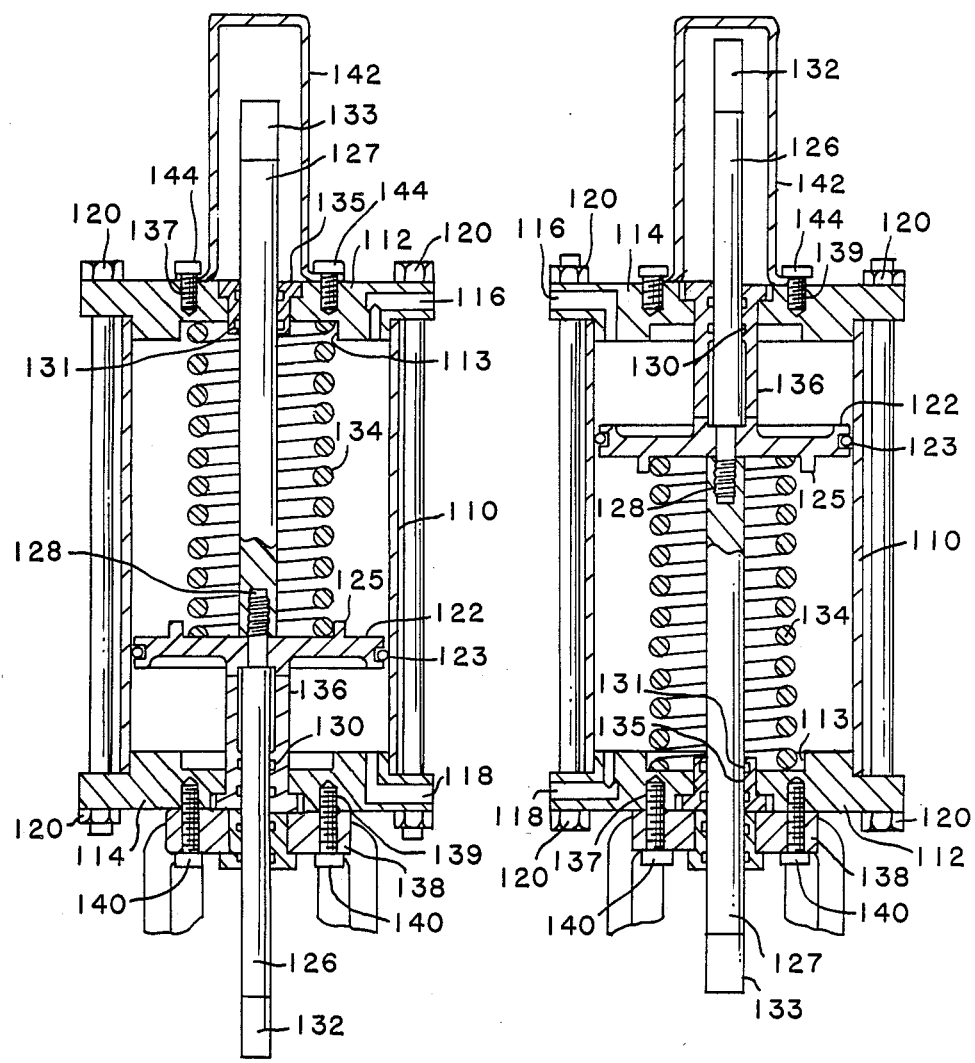

SPRING RETURN CYLINDER ACTUATOR

BACKGROUND AND SUMMARY OF THE INVENTION

The present invention relates generally to spring return cylinder actuators and more specifically to reversible spring return cylinder actuators.

A spring return cylinder actuator generally includes a piston in a cylinder which extends or retracts a piston rod connected to the piston based on the pressure at the ports. The return spring is used to return the piston to a no pressure position. The spring return cylinder actuator, through its piston rod, controls the position of an operable device. When connected to a valve, the cylinder actuator controls the position of the valve either between open and closed, or can control it to varying positions therebetween. Upon failure of the fluid pressure system, be it hydraulic or pneumatic, to the cylinder actuator, the return spring forces the piston rod, and consequently the device to be controlled, to a fixed, no pressure position. Using a valve for example, the desired failure, or no cylinder actuator pressure position of the valve will either be opened or closed depending upon the system in which the valve is installed. Thus, the spring return of the cylinder actuator must be designed specifically for the system so that the device to be controlled by the actuator fails in either a piston rod extended or piston rod retracted position.

In the prior art, the user would have to stock two types of spring return cylinder actuators; one for the failure in the extended piston rod position, and one for the failure in the retracted piston rod position. In an attempt to reduce the amount of inventory, reversible spring return cylinder actuators have been designed. In order to reverse the operation in these devices, the cylinder itself had to be disassembled with the piston, piston rod and spring being removed and placed in a different order with respect to each other and then reinserted into the cylinder housing to convert between a no pressure, extended and a no pressure, retracted embodiment. Not only is this assembly and reassembly time-consuming, but it also offers the opportunity to damage the seals on the cylinder and the piston. Also, depending upon the environment, it may be very difficult to disassemble the cylinder because of corrosion.

If a powerful return spring is used, an uneven spring force on the piston may result, causing it to cock or tilt. This cocking or tilting will decrease the life of the piston seals and provide hysteresis in the position of the actuator in response to the fluid signals.

Thus, it is an object of the present invention to provide a spring return cylinder actuator which may be converted between extended and retracted, no pressure positions without disassembly of the cylinder/piston assembly.

Another object of the present invention is to provide a spring return cylinder actuator with longer life.

A still even further object of the present invention is to provide a spring return cylinder actuator with minimum hysteresis.

An even further object of the present invention is to provide a spring return cylinder actuator with the strongest possible spring and the minimum side loading of the piston.

These and other objects are achieved by providing a pair of piston rods connected to the piston and extending exterior the housing with a spring biasing the piston to a no pressure position. By providing attachment to the exterior end of each rod, as well as mountings on each end of the cylinder housing, the device may be mounted with either piston rod and at either end of the housing such that depending upon which piston rod is attached to the device to be actuated, either an extended or retracted no pressure spring return cylinder actuator will be defined.

The two end walls of the housing each include a bushing through which the respective piston rods extend. This stabilizes the piston and prevents canting under the heavy spring loads, thereby extending the life and reducing the hysteresis. One of the bushings include a stop defining the no pressure position. This stop is threadably received in its end wall and adjusts the preloading or precompression of the spring. A rod cover is mounted to the end of the housing which is not to be mounted to the device to be actuated at the mountings to cover the piston rod which is not to be connected to the device to be actuated. The mountings are identical on both sides of the housing and include identical patterns of threaded bores to receive fasteners to mount the housing to the device to be actuated and to mount the Piston rod cover to the housing. The piston rods are sized such that one of the piston rods extends substantially further beyond the housing than the other when the piston is in the no pressure position.

Other objects, advantages and novel features of the present invention will become apparent from the following detailed description of the invention when considered in conjunction with the accompanying drawings.

BRIEF DESCRIPTION OF THE DRAWINGS

FIGS. 3 and 4 are cross-sectional views of a spring return cylinder according to the present invention in the extended, no pressure position of FIG. 3 and the retracted, no pressure position of FIG. 4.

DETAILED DESCRIPTION OF THE DRAWINGS

Figure 1:
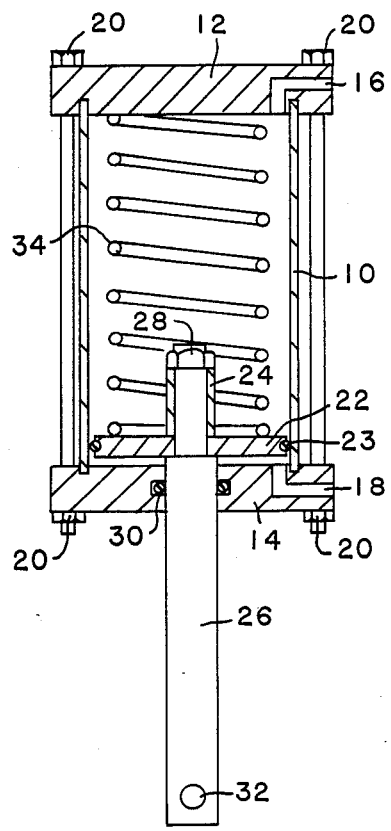
FIGS. 1 and 2 are cross-sectional views of a prior art spring return cylinder actuator convertible between the extended, no pressure position of FIG. 1 and the retracted, no pressure position of FIG. 2.
Figure 2:
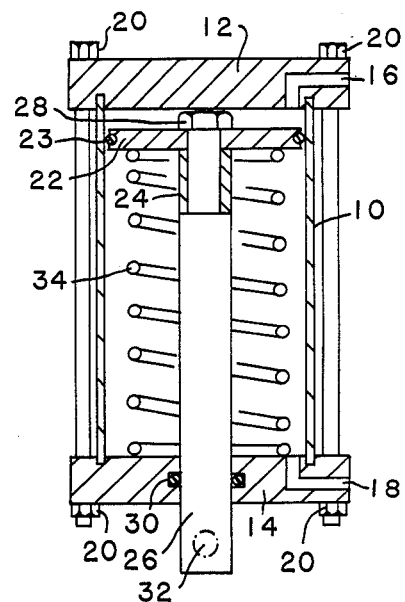

The prior art reversible spring return cylinder actuator is illustrated in FIGS. 1 and 2 as including a cylinder 10 having end walls 12 and 14. Ports 16 and 18 provide fluid access to the interior of the cylinder 10. Fasteners 20 hold the end walls 12 and 14 to each other. A piston 22 having O-rings 23 and a spacer 24 are mounted to a single piston rod 26 by a fastener 28. Piston rod 26 extends through an opening in the end wall which includes O-ring seals 30. Means to attach the piston rod 26 to a device to be actuated is illustrated as an aperture 32. A spring 34 compresses against piston 22 and either end wall 12, as illustrated in FIG. 1, or end wall 14, as illustrated in FIG. 2, depending upon whether the device is to be operated as an extended or retracted, no pressure actuator, respectively. The wall 14 is mounted to the device to be actuated by means not shown in both the extended and retracted modes for no pressure.

To convert from the extended mode of FIG. 1 to the retracted mode of FIG. 2, one of the end walls 12 must be removed providing access to the spring 34, the fastener 28, the spacer 24 and the piston 22. After removing the end wall 12, spring 34 is removed. Next, the fastener 28 is removed and spacer 24 and piston 22 are removed from piston rod 26. The spacer 24 and the spring 34 are replaced before the piston 22, with the piston 22 being replaced next. The fastener 28 is then reapplied. End wall 12 is then reapplied with fasteners 20. Thus, a single piston is used to be connected to the device to be actuated and the same end of the housing is used to mount the cylinder to the device to be actuated.

The present invention is illustrated in FIGS. 3 and 4 in the extended and the retracted, no pressure modes, respectively. Those parts having the same function as the prior art device of FIGS. 1 and 2 have the same units and decimal reference numerals.

The cylinder includes a side wall 110 with end walls 112 and 114. A pair of ports 116 and 118 provide access to the interior of the cylinder 110. Fasteners 120 secure the two end walls 112 and 114 to each other. A piston 122 having seals 123 slides along the walls of the cylinder 110. A pair of piston rods 126 and 127 extend through end walls 114 and 112, respectively. Piston rods 126 and 127 join together at complementary threaded portions 128 to each other and to the pistons 122. Stop bushing 136 and bushing 135, respectively, through which piston rods 126 and 127 extend are threadably received in end walls 114 and 112 and include O-rings 130 and 131. The stop bushing 136 includes an extended cylindrical stop portion which defines the no pressure position of the piston 122 and the preloading or precompression of spring 134. Each of the piston rods 126 and 127 include an attachment means 132 and 133, respectively, to attach to the device to be actuated by the spring return cylinder actuator.

The spring 134 is precompressed by stop bushing 136 between piston 122 with a circumferial seat 125 and a recess 113 in end wall 112. The spring 134 biases the piston 122 against stop bushing 136. It should be noted that the relationship between the spring 134, the piston 122 and the end walls 112 and 114 are the same in FIGS. 3 and 4.

End walls 112 and 114 each include a plurality of threaded apertures 137 and 139 respectively. These apertures have the same pattern and position Circumferially on the end walls. Fasteners 140 are extended through a portion 138 of the static portion of the device to be controlled and into threaded recess 139 of end wall 114 in FIG. 3 and into threaded recess 137 of end wall 112 in FIG. 4. At the opposite end wall of the housing, fasteners 144 extend through and secure a piston rod cover 142 to the end wall 112 in FIG. 3 and the end wall 114 in FIG. 4 by being threadably received in threaded recess 137 in FIG. 3 and 139 in FIG. 4. It should be noted that end walls 112 and 114 are identical, each including a fluid port 116, 118, a spring recess 113, a bore for a bushing 135, 136 and a plurality of threaded apertures 137, 139.

As can be seen in FIGS. 3 and 4, piston rod 126 extends further past its respective end wall 114 than piston rod 127 past its respective end wall 112 when the piston 122 abuts stop bushing 136 under the biasing spring 134 in its non-pressure position. Thus, piston rod 127 can be designated the retracted mode piston rod and piston rod 126 can be designated the extended mode piston rod. To use the spring return cylinder actuator in the extended position, the device to be actuated is mounted by its mounting area 138 to wall 114 such that the extended piston rod 126 extends into the device to be actuated where it is coupled to an appropriate element to be controlled at aperture 132. At the opposite wall 112, which is not mounted to the device to be actuated, the piston cover 142 is mounted thereto.

To reverse this arrangement, the fasteners 140 are removed so as to remove the whole spring return cylinder actuator from the device to be mounted. Similarly, fasteners 144 are removed also as to remove cover 142. The device is then rotated basically 180° such that wall 112 is adjacent the mounting area 138 of the device to be actuated. Fasteners 140 are then extended into the apertures 137 in wall 112 to mount the device to be actuated thereto. The retracted piston rod 127 then extends and can be coupled at 133 to the device to be controlled. The piston cover 142 is then mounted to wall 114 by fasteners 144 received in threaded apertures 139.

Thus, it can be seen that the reversing of the cylinder from the extended to the retracted mode merely requires removing fasteners 140 and 144, rotating the device, and reapplying the fasteners. The spring, piston rods and piston, as well as the cylinder and end caps, are not disassembled, nor are their internal relationships changed.

It should be noted that by using a pair of piston rods 126 and 127, both extending through a respective end, the piston 122 is provided with a positive guidance at both ends of the cylinder and does not operate in a cantilevered manner. This substantially eliminates any twisting or canting of the piston 122 as a result of heavy spring force, thereby extending the life of the piston seal and substantially eliminating hysteresis. Thus, a larger spring 134 may be used since the side loading is either reduced or carried by the piston rods 126 and 127 at their respective end walls.

The spring return cylinder actuator of the present invention may be used with valves which are operated rectilinear as well as rotationally. It may also be used with other devices which can be controlled by rectilinear motion of a cylinder.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A spring return cylinder actuator comprising:
   a housing having first and second fluid ports connected to a bore in said housing;
   a piston in said bore movable between said first and second ports;
   spring means in said housing for biasing said piston in a first direction towards a no pressure position;
   first and second piston rods extending axially in opposite directions from said piston to the exterior of said housing, wherein said first piston rod extends from said housing a further distance than said second piston rod extends from said housing in said no pressure position of said piston;
   rod attachment means on an exterior end of each piston rod for attaching either of said piston rods to a device to be actuated; and
   exterior mounting means on each end of said housing for mounting said housing to said device to be actuated at either end of said housing;
   whereby said actuator can be mounted and attached to operate the device to be actuated in either a push or pull mode without disassembly of the actuator itself.

2. A spring return cylinder actuator according to claim 1, wherein said housing includes two end walls and a bushing in each of said end walls through which a piston rod extends.

3. A spring return cylinder actuator according to claim 1, including a rod cover removably mounted to an end of said housing at a mounting means which is not used to mount said housing to said device to be actuated.

4. A spring return cylinder actuator according to claim 3, wherein said mounting means are identical.

5. A spring return cylinder actuator according to claim 4, wherein said mounting means each includes an identical pattern of threaded bores for receiving fasteners to mount said housing to a device to be actuated and to mount said rod cover to said housing.

6. A spring return cylinder actuator according to claim 1, wherein said mounting means are identical.

7. A spring return cylinder actuator according to claim 6, wherein said mounting means each includes an identical pattern of threaded bores for receiving fasteners to mount said housing to a device to be actuated.

8. A spring return cylinder actuator according to claim 1, wherein said spring means is a spring in said bore between said piston and a first end wall of said housing.

9. A spring return cylinder actuator according to claim 8, including a stop in said housing axially extending from a second end wall into said bore to define said no pressure position.

* * * * *